(12) United States Patent
Neely et al.

(10) Patent No.: US 7,231,607 B2
(45) Date of Patent: Jun. 12, 2007

(54) MOSAIC-LIKE USER INTERFACE FOR VIDEO SELECTION AND DISPLAY

(75) Inventors: Shawn R. Neely, Sunnyvale, CA (US); Lawrence Kesteloot, San Francisco, CA (US); Margaret Novotny, San Francisco, CA (US); Marion Buchenau, San Francisco, CA (US); Sheila A. Foley, Sausalito, CA (US); Michael O'Neil, San Francisco, CA (US)

(73) Assignee: Kaleidescope, Inc., Mountain View, CA (US)

( * ) Notice: Subject to any disclaimer, the term of this patent is extended or adjusted under 35 U.S.C. 154(b) by 942 days.

(21) Appl. No.: 10/418,739

(22) Filed: Apr. 18, 2003

(65) Prior Publication Data

US 2004/0070593 A1    Apr. 15, 2004

Related U.S. Application Data

(60) Provisional application No. 60/439,330, filed on Jan. 9, 2003, provisional application No. 60/394,922, filed on Jul. 9, 2002, provisional application No. 60/394,588, filed on Jul. 9, 2002.

(51) Int. Cl.
*G06F 7/00* (2006.01)
*G06F 17/60* (2006.01)

(52) U.S. Cl. ...................... 715/747; 715/821
(58) Field of Classification Search ........ 715/744–747, 715/821–824, 719–726, 771–773, 970.1, 715/962; 707/3; 709/224, 217, 246; 705/27; 725/47, 46, 61
See application file for complete search history.

(56) References Cited

U.S. PATENT DOCUMENTS 4,992,940 A    2/1991    Dworkin (Continued)

FOREIGN PATENT DOCUMENTS

EP    1 199 647 A2    4/2002

(Continued)

OTHER PUBLICATIONS

ACD Systems. "ACDSee: digital photo software, picture viewer & photo editor." 2005, ACD Systems, http://acdsystems.com/English/Products/ACDSee/overview?LAN=EnglishX50.

(Continued)

*Primary Examiner*—Steven Sax
(74) *Attorney, Agent, or Firm*—Swernofsky Law Group PC (57) ABSTRACT

A UI involving selection and display from a library of videos, including a "Mosaic" mode of operation, in which a primarily visual display is made of information about possible videos, with the effect that a user might select one such video in response to such visual display. The Mosaic includes an two-dimensional array of entries, each of which has visual information for that entry. The Mosaic collects relatively similar entries near to each other in the visual field seen by a user. The focus is centralized and emphasized, and has auxiliary information displayed for further understanding. The array is dynamically rearranged in response to change in focus and metadata about the entries. Relative weighting of that metadata is responsive to user choice. The array includes rows and columns each of which includes all possible entries, but offset by relatively prime values.

11 Claims, 3 Drawing Sheets

U.S. PATENT DOCUMENTS

| | | | |
|---|---|---|---|
| 5,335,277 A | 8/1994 | Harvey et al. | |
| 5,337,357 A | 8/1994 | Chou et al. | |
| 5,410,415 A | 4/1995 | Parulski et al. | |
| 5,724,327 A | 3/1998 | Timmermans et al. | |
| 5,765,176 A | 6/1998 | Bloomberg | |
| 5,896,454 A | 4/1999 | Cookson et al. | |
| 5,946,665 A | 8/1999 | Suzuki et al. | |
| 6,009,525 A | 12/1999 | Horstmann | |
| 6,166,735 A | 12/2000 | Dom et al. | |
| 6,182,069 B1 | 1/2001 | Niblack et al. | |
| 6,188,728 B1 | 2/2001 | Hurst | |
| 6,192,139 B1 | 2/2001 | Tao | |
| 6,209,092 B1 | 3/2001 | Linnartz | |
| 6,211,876 B1 | 4/2001 | Ackermann et al. | |
| 6,229,524 B1 | 5/2001 | Chernock et al. | |
| 6,243,725 B1* | 6/2001 | Hempleman et al. | 715/530 |
| 6,260,024 B1 | 7/2001 | Shkedy | |
| 6,278,446 B1 | 8/2001 | Liou et al. | |
| 6,349,143 B1 | 2/2002 | Hastings et al. | |
| 6,366,910 B1 | 4/2002 | Rajaraman et al. | |
| 6,374,036 B1 | 4/2002 | Ryan et al. | |
| 6,411,725 B1 | 6/2002 | Rhoads | |
| 6,463,426 B1 | 10/2002 | Lipson et al. | |
| 6,463,431 B1* | 10/2002 | Schmitt | 707/5 |
| 6,563,935 B1 | 5/2003 | Echizen et al. | |
| 6,614,914 B1 | 9/2003 | Rhoads et al. | |
| 6,618,035 B1* | 9/2003 | Reza | 345/158 |
| 6,625,581 B1 | 9/2003 | Perkowski | |
| 6,629,097 B1 | 9/2003 | Keith | |
| 6,633,653 B1 | 10/2003 | Hobson et al. | |
| 6,642,939 B1 | 11/2003 | Vallone et al. | |
| 6,694,041 B1 | 2/2004 | Brunk | |
| 6,714,683 B1 | 3/2004 | Tian et al. | |
| 6,728,213 B1 | 4/2004 | Tzeng et al. | |
| 6,772,340 B1 | 8/2004 | Peinado et al. | |
| 6,801,999 B1 | 10/2004 | Venkatesan et al. | |
| 6,889,383 B1 | 5/2005 | Jarman | |
| 6,904,151 B2 | 6/2005 | Deguillaume et al. | |
| 6,904,410 B1 | 6/2005 | Weiss et al. | |
| 6,957,232 B2 | 10/2005 | Hoeye et al. | |
| 6,971,013 B2 | 11/2005 | Mihcak et al. | |
| 6,973,574 B2 | 12/2005 | Mihcak et al. | |
| 7,002,603 B2 | 2/2006 | Tapson | |
| 7,003,131 B2 | 2/2006 | Watson et al. | |
| 7,032,177 B2 | 4/2006 | Novak et al. | |
| 7,036,024 B2 | 4/2006 | Watson | |
| 7,076,737 B2* | 7/2006 | Abbott et al. | 715/744 |
| 7,099,491 B2 | 8/2006 | Takaku | |
| 7,111,171 B2 | 9/2006 | Collens et al. | |
| 2001/0037465 A1 | 11/2001 | Hart et al. | |
| 2001/0039659 A1 | 11/2001 | Simmons et al. | |
| 2001/0051996 A1 | 12/2001 | Cooper et al. | |
| 2001/0056398 A1* | 12/2001 | Scheirer | 705/38 |
| 2002/0029187 A1 | 3/2002 | Meehan et al. | |
| 2002/0054174 A1* | 5/2002 | Abbott et al. | 345/863 |
| 2002/0085713 A1 | 7/2002 | Feig et al. | |
| 2002/0087876 A1 | 7/2002 | Larose | |
| 2002/0095582 A1 | 7/2002 | Peled et al. | |
| 2002/0116707 A1 | 8/2002 | Morris et al. | |
| 2002/0118299 A1 | 8/2002 | Kahn | |
| 2002/0138741 A1 | 9/2002 | Koch | |
| 2002/0150277 A1 | 10/2002 | Nishimoto et al. | |
| 2002/0172394 A1 | 11/2002 | Venkatesan et al. | |
| 2002/0174021 A1 | 11/2002 | Chu et al. | |
| 2002/0178077 A1 | 11/2002 | Katz et al. | |
| 2002/0196976 A1 | 12/2002 | Mihcak et al. | |
| 2003/0009671 A1 | 1/2003 | Yacobi et al. | |
| 2003/0014751 A1 | 1/2003 | Paek | |
| 2003/0018972 A1* | 1/2003 | Arora | 725/47 |
| 2003/0030752 A1 | 2/2003 | Begeja et al. | |
| 2003/0040850 A1* | 2/2003 | Najmi et al. | 701/1 |
| 2003/0050818 A1* | 3/2003 | Maie et al. | 705/8 |
| 2003/0182297 A1 | 9/2003 | Murakami et al. | |
| 2004/0039661 A1* | 2/2004 | Fuzell-Casey et al. | 705/27 |
| 2004/0044658 A1* | 3/2004 | Crabtree et al. | 707/3 |
| 2004/0049537 A1* | 3/2004 | Titmuss | 709/203 |
| 2004/0073921 A1* | 4/2004 | Neely et al. | 725/45 |
| 2004/0139064 A1* | 7/2004 | Chevallier et al. | 707/3 |
| 2006/0004680 A1* | 1/2006 | Robarts et al. | 706/12 |
| 2006/0031260 A1* | 2/2006 | Minezaki et al. | 707/104.1 |
| 2006/0095300 A1* | 5/2006 | Schrier et al. | 705/3 |

FOREIGN PATENT DOCUMENTS

| | | |
|---|---|---|
| JP | 2006-520944 A | 9/2006 |
| WO | WO 02/075591 A1 | 9/2002 |
| WO | WO 2004/062945 A2 | 7/2004 |
| WO | WO 2004/064372 A2 | 7/2004 |

OTHER PUBLICATIONS

Carnegie Mellon University. "Informedia II Digital Video Library: Auto Summarization and Visualization Across Multiple Video Documents and Libraries." 1994-2005, Carnegie Mellon, http://www.informedia.cs.cmu.edu/kli2/index.html.

Chu et al. "A Secure Multicast Protocol with Copyright Protection." ACM SIGCOMM Computer Communications Review, Apr. 2002, pp. 42-60, vol. 32, No. 2.

Dittman. "Combining Digital Watermarks and Collusion Secure Fingerprints for Customer Copy Monitoring." The Institution of Electrical Engineers, 2000, pp. 6/1-6/6, IEE.

Fridrich. "Copyright Protection of Digital Images (authentication)." http://www.ws.binghamton.edu/fridrich/Research'tutor2.ppt, Feb. 18, 2003, entire document.

Rey et al. "A Survey of Watermarking Algorithms for Image Authentication." EURASIP Journal on Applied Processing, 2002, pp. 1-9, Hindawi Publishing Corporation.

\* cited by examiner

MOSAIC-LIKE USER INTERFACE FOR VIDEO SELECTION AND DISPLAY

BACKGROUND OF THE INVENTION

1. Field of the Invention

The invention relates to user interfaces for video selection and display.

2. Related Art

In systems for presenting information, such as for example audiovisual media, there are now so many possible choices that individuals find it difficult to remember them all. Accordingly, such systems generally involve a UI (user interface) by which users might search for possible choices, with the effect that those users are able to select one or more choices for presentation. However, while they achieve the general goal of allowing users to search and select, known systems are subject to several draw-backs.

First, there are often such a large number of entries or titles that presenting even a small fraction of them for review by users, such as on an OSD (on screen display), or a video screen or similar interface, is unwieldy. Moreover, the large number of entries or titles makes it difficult for the user to make meaningful comparisons among multiple titles, either using a single data field for categorization, or using a plurality of data fields for categorization. In the latter case, the number of possible data fields and the fuzziness of the concept of similarity among entries or titles makes the task extremely problematic for users.

Some known systems allow users to sort lists of entries, but one result of such sorting is that the user is presented with a linear list of entries or titles, disposed in a fashion that is often difficult on the eye and relatively unhelpful for selection of an individual entry or title. This is a relatively greater drawback when many entries or titles have data fields that might be categorized into multiple groups. For example, many videos might be characterized as both "comedy" and "western," or as both "action-adventure" and "mystery," and the like. Some known systems allow users to search or sort entries by such categories, but the user's ability to locate entries with similar categories can be relatively limited, depending on the degree of sorting allowed and the number of sort keys allowed per entry.

This has the effect that only the most sophisticated users, those who are already very familiar with the corpus of possible entries or titles, can make meaningful use of combining database search techniques and linear presentation of information. There are several aspects of the invention in which this problem is ameliorated: (1) a relatively large corpus of information is sorted in such manner as to centralize and emphasize a set of similar entries or titles, possibly when considered along a plurality of data fields, (2) the user is presented with a focused-upon entry or title, with the option for causing the system to dynamically reorder those entries or titles in the corpus of information in response to the focused-upon entry or title, (3) those entries or titles having relatively greater similarity to the focused-upon entry or title are centralized and emphasized, with the effect that the user can easily and readily locate at least some entries or titles of interest, and (4) the user is presented with the ability to scroll through the presented mosaic of entries or titles, with the effect that the user is not restricted to a subset of the corpus of entries or titles when viewing the mosaic.

Accordingly, it would be advantageous to provide an improved user interface for video selection and display.

SUMMARY OF THE INVENTION

The invention provides a method and system capable of presenting a UI (user interface) involving selection and display of videos from a library thereof, although of course the concepts of the invention are not limited to videos. The UI includes a "Mosaic" mode of operation, in which a primarily visual display is made of information about possible videos, with the effect that a user might select one such video in response to such visual display.

1. Graphical Representation of Entries

Entries from the library (preferably, a relatively large corpus of information) are presented in a graphical format, with entries each displayed including at least one graphical form sufficient for the user to recognize that entry, and preferably representative of at least one data field associated with that entry. For example, not intended to be limiting in any way, for displaying information for a library of videos, each entry might be displayed using its lobby poster (also known in the movie industry as a "one sheet"), possibly along with additional text such as a caption. However, in alternative embodiments, the graphical form sufficient for the user to recognize that entry might be dynamically generated, in response to data fields associated with that entry, in response to other information, or in response to some combination or conjunction thereof.

In one embodiment, the Mosaic is organized as a multi-dimensional display of entries, each of which has visual information relating to that entry. For example, not intended to be limiting in any way, the Mosaic is organized as a two-dimensional array of movie posters, each representative of one entry in the library. This two-dimensional array preferably includes auxiliary information disposed near a focused-upon entry, as described below.

The focused-upon entry is relatively centralized and emphasized, and might have auxiliary information about that specific entry displayed for further user understanding. For example, not intended to be limiting in any way, additional information about a video might be displayed in a screen region near the lobby poster for that video, such as to the right or left of that lobby poster, and might include auxiliary information about the video such as its title, maturity rating, quality rating, genre, actors, and year of publication. Additional such information, such as for example director, language, a summary description of the movie, a more detailed description or set of reviews of the movie, and the like, might be presented in response to a user request. For example, not intended to be limiting in any way, auxiliary information about the movie might be presented, possibly in conjunction with enlarging or otherwise emphasizing the screen region associated with that auxiliary information, in response to the user pointing to, clicking on, mousing over, or otherwise selecting, the focused-upon entry or its auxiliary information.

In one embodiment, the Mosaic is presented with the focused-upon entry highlighted or otherwise emphasized, with relatively lesser highlighting or other emphasis for those entries that are not focused-upon, and with relatively lesser highlighting or other emphasis for those entries positioned relatively distant from the focused-upon entry.

2. Entry Positioning and Distances

In one aspect of the invention, the UI presents visual representations of relatively similar entries relatively near to each other, with the effect that those entries or titles having relatively greater similarity to the focused-upon entry or title are presented near the focused-upon entry or title, and might have their similarity otherwise emphasized as well. This has the effect that, if the user is interested in the focused-upon entry or title, the user can also easily and readily locate at least some entries or titles of with possible similar interest.

In one embodiment, pairs of individual entries are compared, and a measure of content distance (responsive to information about those entries, such as for example information about their content) is determined. Individual entries are displayed in a format in which display distance within the OSD is correlated with content distance. This has the effect that similar videos are displayed in relative proximity within the OSD.

In one embodiment, content distance (that is, the degree to which the system regards distinct videos as similar or dissimilar) is responsive to metadata about those videos. For example, not intended to be limiting in any way, such metadata might include keywords in the title of the video, a genre assigned to the video (such as for example "comedy" or "western," a set of actors or characters involved with the video, a series into which the video is classified (that is, "Star Wars" or "Jackie Chan Movies"), a director or producer or studio associated with the video, a year in which the video was made or remade, a rating assigned to the video (such as for example, TV-Y, G, PG, or R, or some other selected set of ratings), a set of awards associated with the video (such as for example "best cartoon" or "best foreign film"), and the like.

In one embodiment, aspects of the cover art (herein sometimes referred to as "movie posters") might also be compared, such as for example whether that cover art is abstract or shows a scene, whether that cover art shows a selected actor, whether that cover art is primarily pictorial or text, and the collection of brightness, hue, and saturation associated with that cover art (with the effect, for example, of differentiating between the cover of a box of "Tide" and a work from Picasso's Blue Period).

In one embodiment, relative weighting assigned to each data field of metadata is responsive to user choice, where that user choice might be expressed (a) relatively directly, such as for example by selecting a relative weighting value, (b) relatively indirectly, such as for example by the system deducing the user's preferred relative weighting value in response to those videos actually selected for viewing or as the next video for focus, or (c) in response to demographic information about the user, possibly in combination or conjunction with collaborative filtering information.

3. Dynamic Repositioning

In one embodiment, selection of actual placement is random or pseudorandom, preferably in response to both metadata information and random or pseudorandom information, and dynamically determined, preferably in response to both a content distance from a focused-upon entry and random or pseudorandom information. This has the effect that when the user changes focus, the Mosaic dynamically rearranges the display in response to one or more possible triggering events, with the effect that videos may be moved into or out of the user's field of vision within the OSD. In one embodiment, the one or more triggering events might include (a) an explicit request by the user for dynamic rearrangement, (b) selection of a new focused-upon entry by the user, (c) incoming new data to be incorporated by the UI for presentation, and the like, as well as combinations or conjunctions thereof.

In one embodiment, when performing dynamic rearrangement, the rearrangement is presented to the user as a continuous process, with individual movie posters being presented as moving, for a fraction of a second, from a first to a second position. In alternative embodiments, the rearrangement may be presented to the user as a process having at least some continuous elements, such as for example either (a) a single transform into a new rearrangement, (b) a sequence of transforms, each being relatively smooth, but with time boundaries in between sequential elements, such as for example sliding individual rows and columns in a sequence, (c) a stochastic set of transforms, such as exchanging pairs of videos, or replacing video to be removed with a video to be inserted. For one example, not intended to be limiting in any way, it is possible that that same entries will be presented after dynamic rearrangement, but in completely different locations.

4. Scrolling and Paging

In one embodiment, the selected movie posters are arranged with the effect of tiling the screen area of the OSD, with the effect that a relatively maximum number of movie posters are displayed within that limited screen area. However, in alternative embodiments, it might occur that the selected movie posters are arranged in an overlapped manner (thus possibly having the effect of displaying more movie posters, but not necessarily all of their content simultaneously), or with spacing in between, with the effect of presenting the user with a preferred pleasing arrangement.

In one embodiment, the Mosaic is presented as a two-dimensional array of picture elements (such as a movie poster for each video), with the property that a user might scroll either horizontally or vertically within the two-dimensional array without missing any entries. That is, all entries presented in the Mosaic appear at least somewhere in each row and each column of the two-dimensional array. This has the effect of presenting a visual illusion that the two-dimensional array of images is infinite in extent, while actually it is the case that scrolling in any one direction (right, left, up, down) sufficiently will eventually return to the same presentation of cover art. Those skilled in the art will recognize, after perusal of this application, that this has the effect of presenting the user with a relatively small rectangular window view onto the surface of a torus, but that in the context of the invention there is no requirement that the surface be a torus, and instead might be a sphere or some other shape.

INCORPORATED DISCLOSURES

This application claims priority of the following documents, each of which is hereby incorporated by reference as if fully set forth herein.

U.S. provisional patent application 60/394,922, filed Jul. 9, 2002, in the name of Michael Malcolm, Stephen Watson, and Daniel Collens, titled "System Architecture of a System for Secure Distribution of Media."

U.S. provisional patent application 60/394,588, filed Jul. 9, 2002, in the name of Michael Malcolm, Stephen Watson, and Daniel Collens, titled "Topology of Caching Nodes in a System for Secure Delivery of Media Content."

U.S. provisional patent application 60/439,330, filed Jan. 31, 2003, in the name of the same inventors as this application, titled "User Interface for Video Selection and Display".

U.S. patent application Ser. No. 10/439,330, filed this same day, in the name of the same inventors as this application, titled "Guide-Like User Interface for Video Selection and Display".

These documents are hereby incorporated by reference as if fully set forth herein, and are sometimes referred to herein as the "incorporated disclosure".

Inventions described herein can be used in combination or conjunction with technology described in the incorporated disclosure.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The general meaning of each of these following terms is intended to be illustrative and in no way limiting.

The phrase "media stream" describes information intended for presentation in a sequence, such as motion pictures including a sequence of frames or fields, or such as audio including a sequence of sounds. As used herein, the phrase "media stream" has a broader meaning than the standard meaning for "streaming media," (of sound and pictures that are transmitted continuously using packets and that start to play before all of the content arrives). Rather, as described herein, there is no particular requirement that "media streams" must be delivered continuously. Also as described herein, media streams can refer to other information for presentation, such as for example animation or sound, as well as to still media, such as for example pictures or illustrations, and also to databases and other collections of information.

The phrase "digital content" describes data in a digital format, intended to represent media streams or other information for presentation to an end viewer. "Digital content" is distinguished from packaging information, such as for example message header information. For the two phrases "digital content" and "media stream," the former describes a selected encoding of the latter, while the latter describes a result of presenting any encoding thereof.

The scope and spirit of the invention is not limited to any of these definitions, or to specific examples mentioned therein, but is intended to include the most general concepts embodied by these and other terms.

System Elements

Figure 1:
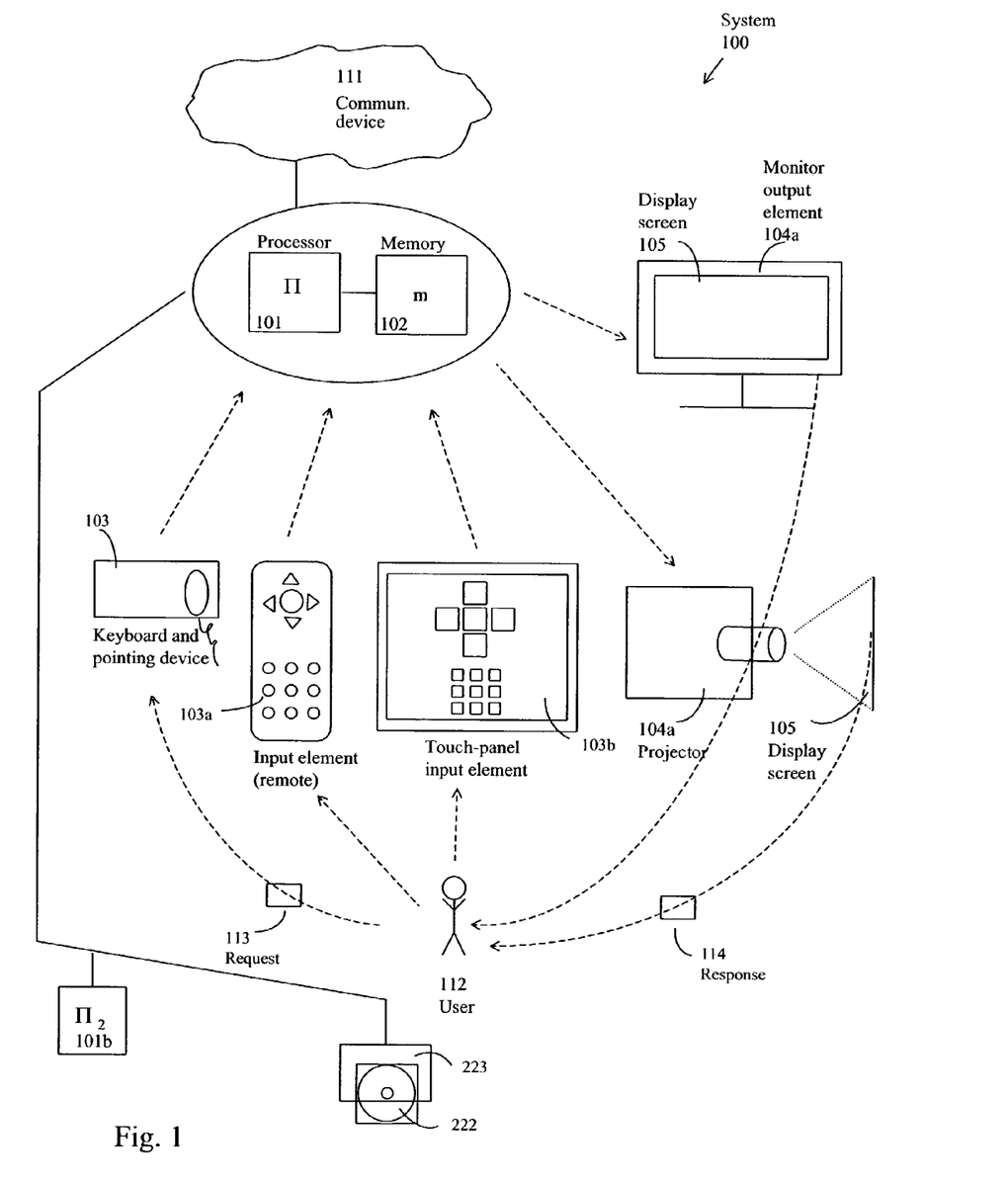
FIG. 1 shows a block diagram of a system including a mosaic-like user interface for video selection and display.

FIG. 1 shows a block diagram of a system including a mosaic-like user interface for video selection and display.

A system 100 includes a processor 101, program and data memory or mass storage 102, at least one input element 103, and at least one output element 104.

Those of ordinary skill in the art will recognize, after perusal of this application, that each of these elements in a system 100 might be implemented in one of a variety, of possible ways.

For example, not intended to be limiting in any way, the processor 101 and the program and data memory or mass storage 102 might include one or more of the following devices, possibly operating in combination of conjunction: (a) preferably, a stand-alone computing device, such as a set-top box or other auxiliary presentation and display decoder, capable of generalized computation and presentation of information; (b) a PC (personal computer), laptop, workstation, or other device suitable for generalized computation and presentation of information; (c) a handheld computer, "Palm Pilot" device, or other portable device suitable for generalized computation and presentation of information; or (d) any other type of computing device suitable for generalized computation and presentation of information.

For example, not intended to be limiting in any way, the at least one input element 103 might include one or more of the following devices, possibly operating in combination of conjunction: (a) preferably, a remote control, such as a television infrared remote control 103a or a touch-panel control 103b or other type of remote control, (b) a workstation input element 103c, such as for example a keyboard along with a mouse or other pointing device, (c) or other data entry elements, such as for example a speech input or speech recognition device.

For example, not intended to be limiting in any way, the at least one output element 104 might include one or more of the following devices, possibly operating in combination of conjunction: (a) preferably, a flat panel display or computer monitor or television monitor or other display device 104a, along with speakers or other sound presentation devices, (b) another type of television device, such as a projection television device; (c) a projector 104b along with a projection screen or other projection surface; or (d) any other type of device or method suitable for presentation of information. In such cases, the active portion of the video display for the television or other display device is herein sometimes referred to as the display screen 105, and the speakers or other sound presentation devices are herein sometimes referred to as the speaker 106.

Those skilled in the art will recognize, after perusal of this application, that embodiments involving set-top boxes or other auxiliary presentation and display decoders, operating in combination or conjunction with remote controls 103a or touch-panel controls 103b, might be combined in part with embodiments involving PCs, laptops, or workstations, operating in combination or conjunction with workstation input elements 103c such as keyboards and mice. Moreover, those skilled in the art will recognize, after perusal of this application, that such combinations are within the scope and spirit of the invention, and would be workable without undue experimentation or further invention.

In one embodiment, the system 100 is coupled to at least one communication element 110 capable of sending and receiving information from a logically remote device 111, such as for example a computer network coupled to an internet, intranet, LAN, WAN, VPN, or an enterprise network. In one embodiment, the logically remote device 111 might include one or more computing devices capable of receiving requests from a user 112 of the system 100 and responding to those requests by providing information related to use of the system 100. For example, not intended to be limiting in any way, the information might include (a) media streams, such as for example movies; or might include (b) metadata (such as for example titles, ratings, and the like, as some examples are further described herein) about those media streams.

Those skilled in the art would recognize, after perusal of this application, that the communication element 110 could be used in combination or conjunction with the incorporated disclosure, including techniques shown in the provisional patent applications titled "SYSTEM ARCHITECTURE OF A SYSTEM FOR SECURE DISTRIBUTION OF MEDIA" and "TOPOLOGY OF CACHING NODES IN A SYSTEM FOR SECURE DELIVERY OF MEDIA CONTENT."

The memory or mass storage 102 is capable of including instructions capable of being executed or interpreted by the processor 101 to perform steps as described herein. The memory or mass storage 102 is also capable of maintaining data on behalf of the processor 101 as described herein.

The system 100, using the at least one input element 103, is disposed for receiving information from the user 112, such as for example an individual who desires to select a movie for viewing, and using the at least one output element 104, is disposed for presenting information to the user 112. However, in the context of the invention, there is no particular requirement that the user 112 is so limited. The user 112 might include an individual, a company or family or other group, or another entity. In one embodiment, where the user 112 includes a company or family or other group, the user 112 might include more than one person who interacts with the system 100 from time to time.

Moreover, in the context of the invention, there is no particular requirement that the same information is received from each input element 103 or that the same information is presented at each output element 104. In one embodiment, the one or more input elements 103 and the one or more output elements 104 are coupled to the processor 101 and the memory or mass storage 102 using a local network, such as for example a LAN, VPN, or enterprise network.

The system 100, using the processor 101 and program and data memory or mass storage 102, is disposed for processing information from the user 112, such as (a) receiving commands or requests 113 from the user 112, (b) parsing or recognizing those commands or requests 113, (c) determining one or more responses 114 to make to those commands or requests 113, and (d) directing the at least one output element 104 to present those responses 114 to the user 112.

The system 100, using the at least one output element 104, is disposed for presenting information to the user 112.

On-Screen Display

Figure 2:
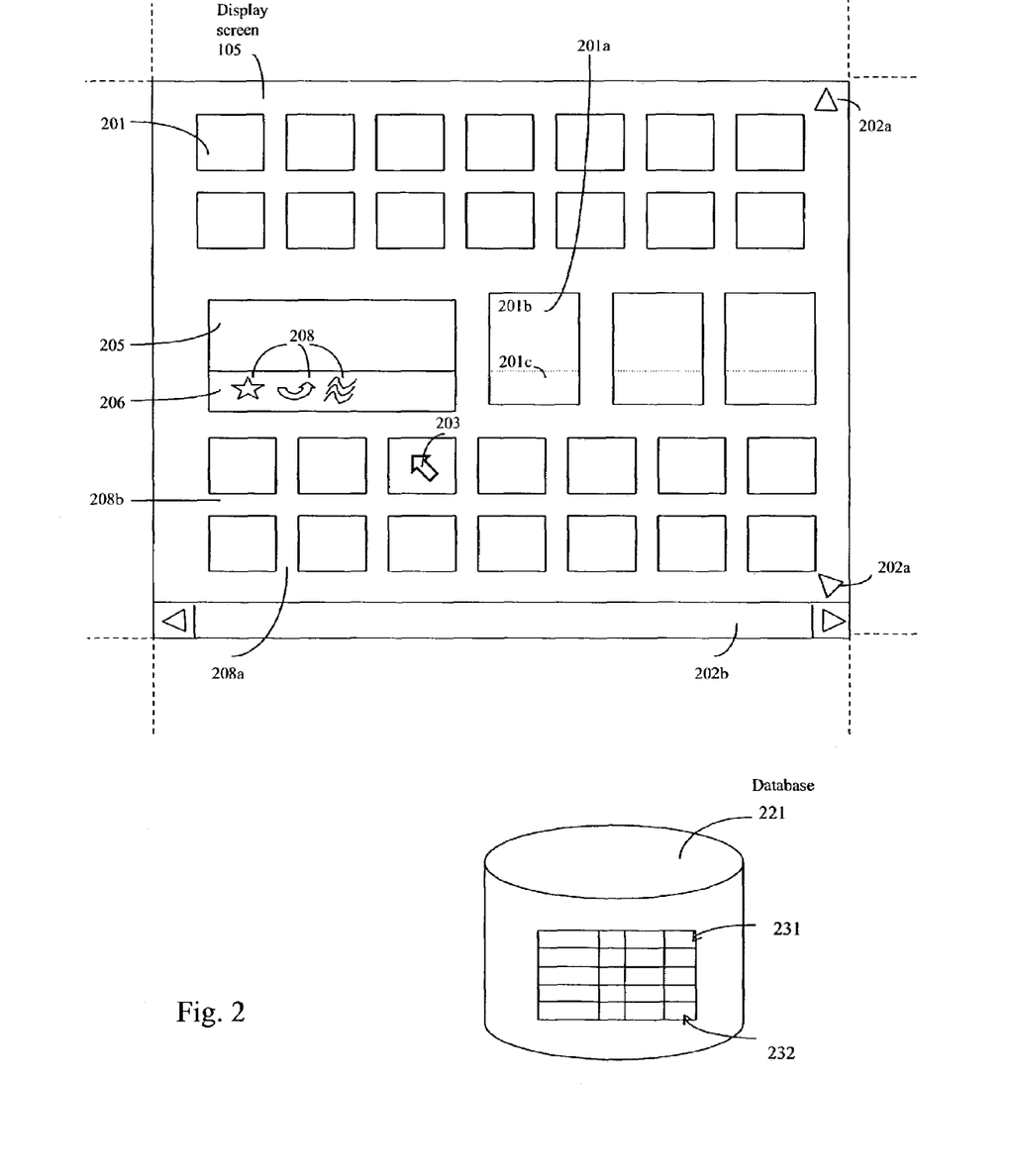
FIG. 2 shows a block diagram of an on-screen display including operation of a mosaic-like guided user interface for video selection and display.

FIG. 2 shows a block diagram of an on-screen display including operation of a mosaic-like guided user interface for video selection and display.

Screen Display

Those skilled in the art will recognize that the input element 103 (such as for example the remote control) and the display screen 105 operate in combination or conjunction, under control of the processor 101 and the program and data memory or mass storage 102, to present a UI (user interface) as described herein.

The UI includes at least some elements to be presented on the display screen 105, including possibly a set of screen regions 201 (possibly disjoint or possibly overlapping), a set of scroll affordances 202a or scroll bars 202b (possibly horizontal or possibly vertical), one or more highlighting features or pointing elements 203, one or more iconic or symbolic elements 204, one or more pictures (possibly still pictures, animation, or motion video), one or more units of text (possibly presented in one or more fonts), and the like.

The UI also includes at least some elements to be received from the user 112 (possibly presented on the display screen 105 or on the touch-panel control 103b), such as a set of buttons 211, possibly pre-selected and fixed in function, or possibly selected in response to user preferences or other input and alterable in function from time to time. For example, not intended to be limiting in any way, an arrangement of buttons 211 might be shown (a) directly on the remote control 103a, and selected by the user 112 by pressing one of the physical buttons 211; (b) directly on the touch-panel control 103b, and selected by the user 112 by pressing one of the areas designated on that touch-panel control 103b as one of the buttons 211; or (c) directly on the display screen 105 in a selected screen region 201, and selected by the user 112 by selecting the button 211 using the pointing device or keyboard.

As described herein, references to the UI "interpreting" input, "presenting" output, or "reacting to" input, describe operations by the processor 101 and the program and data memory or mass storage 102, as described above, to (a) receive commands or requests 113 from the user 112, (b) parse or recognize those commands or requests 113, (c) determine one or more responses 114 to make to those commands or requests 113, and (d) direct the at least one output element 104 to present those responses 114 to the user 112.

For example, in one embodiment, the processor 101 and the program and data memory or mass storage 102, might be responsive to (a) receive inputs from the user 112, and respond to those inputs by moving a position of the pointing element 203, (b) respond to a relative position of that pointing element 203 with regard to one of the screen regions 201, and respond by highlighting or de-highlighting selected screen regions 201, (c) respond to a relative position of that pointing element 203 with regard to one of the scroll affordances 202a or scroll bars 202b, and respond by scrolling or paging one or more of the screen regions 201, (d) respond to a relative position of that pointing element 203 with regard to one of the iconic or symbolic elements 204, and respond by invoking or de-invoking an selected function associated with that one iconic or symbolic element 204, (e) as well as reasonable generalizations thereof, and the like.

Database Presentation

The one embodiment, the display screen 105 is partitioned into a rectilinear tiled set of screen regions 201, such as for example disjoint regions as one might find in a chessboard, although in the context of the invention, there is no particular requirement that each such screen region 201 need be the same height or width. As described herein the rectilinear tiled set of screen regions 201 comprise a set of rows 211 and a set of columns 212, each such row 211 and column 212 intersecting in a single substantially disjoint such screen regions 201.

In alternative embodiments, the "Mosaic" mode of operation may include other dispositions of individual screen regions 201, such as for example (a) a hexagonal pattern of screen regions 201 disposed within the display screen 105, (b) a spiral pattern of screen regions 201 disposed within the display screen 105, (c) a perspective view having the effect of representing a multidimensional pattern of screen regions 201, such as for example a three-dimensional lattice, disposed within the display screen 105, (d) a distribution of screen regions 201 representing a set of clusters of entries 231, (e) a pseudorandom or random distribution of screen regions 201 disposed within the display screen 105, reasonable generalizations thereof, and the like.

In alternative embodiments, the "Mosaic" mode of operation may include individual screen regions 201 having different sizes for distinct entries 231. For a first example, not intended to be limiting in any way, in a perspective view having the effect of representing a three-dimensional pattern of screen regions 201, the UI might present selected screen regions 201 as relatively larger or relatively smaller, with the effect of representing distance in a three-dimensional viewing illusion presented to the user 112. For second example, not intended to be limiting in any way, the UI might present selected screen regions 201 as relatively larger or relatively smaller, with the effect of representing relative importance within a cluster of entries 231 presented to the user 112.

In one embodiment, the "Mosaic" mode of operation is performed in association with a database 221. In one embodiment, the database 221 is available to the processor 101 at the program and data memory 102, but in the context of the invention, there is no particular requirement where the database 221 is specifically located. For example, the database 221 might be located (a) at a remote device available processor 101 using the communication device 111, (b) at an auxiliary processor 101b coupled to the processor 101 or the program and data memory 102, or (c) on a computer-readable medium 222 coupled to a reader 223 thereof, to the processor 101 or the program and data memory 102, or to any other element of the system 100.

The database 221 preferably includes information involving a library or set of videos, such as for example movies that might be selected for presentation, and presented, to the user 112. However, in the context of the invention, there is no particular requirement that the database 221 is limited to videos, or even to information that might be presented to the user 112. For one example, not intended to be limiting in any way, the invention could be used to represent advertisements, animation, audio titles, books or other textual works, computer programs in source or object code form, encyclopedia entries, magazines or articles therefrom, microfiche images, people (real or fictional), still pictures, or more generally, database entries of any kind. Moreover, in the context of the invention, there is no particular requirement that the database 221 is the sole source of information to be presented to the user 112. For one example, not intended to be limiting in any way, the invention could be used in combination or conjunction with other techniques for presenting or representing information, such as in any of the following possibilities: a plurality of such databases 221, a hierarchical representation of data, a hyperlinked representation of data (such as for example a web page), a dynamically generated representation of data (such as for example by an applet), or some combination or mixture thereof.

In one embodiment, the database 221 includes one entry 231 for each such video, and a set of data fields 232, with the property that for each such entry 231, at least some of those data fields 232 have information relating to that entry 231, and with the property that the information in each data field 232 for a first entry 231 bears the same relation to that first entry 231 as the information in that data field 232 for a second entry 231. For one example, not intended to be limiting in any way, if a data field 232 is selected to represent the title of an entry 231, for each entry 231 for which that data field 232 has any information, that information represents the title of that entry 231.

In one embodiment, the database 221 includes a plurality of such entries 231, and a plurality of such data fields 232, with the effect that an individual entry 231 might (or might not) have the same information as another such entry for a related data field 232. For one example, not intended to be limiting in any way, more than one entry 231, each representing a distinct video, might each have a data field 232 representing the genre of that video (such as for example a "comedy" or a "western"), and more than one such entry 231 might have the same information for that data field 232, such as for example if both such videos were comedies.

The database 221 might include multiple data values 222 for one or more such data fields 232 for an entry 231, such as for example a single video might be associated with multiple actors or multiple genres. In one embodiment, a selected screen region 201a (herein sometimes called the "focus" 201a) within the display screen 105 is reserved for a focused-upon entry 231, such as for example a video recently selected by the user 112 as the focused-upon entry 231. The UI presents, at the focus 201a, at least one graphical form 201b, such as a lobby poster, from which the user 112 can readily identify the focused-upon entry 231. (In alternative embodiment, the UI may present, at the focus 201a, more than one such graphical form 201b, such as for example both a lobby poster and selected stills from the movie associated with the focused-upon entry 231, or such as for example an animated or clickable slideshow associated with the focused-upon entry 231.) The UI might also present, adjacent or otherwise near to the focus 201a, additional information, such as for example a caption 201c. In one embodiment, the caption 201c might include (a) a title, (b) a color bar representing a category or genre associated with the movie, (c) a thermometer indicator representing a value associated with the movie, such as for example a maturity rating or quality rating, reasonable generalizations thereof, and the like.

The focus 201a has associated with it an auxiliary information area 205, in which the UI presents auxiliary information about the focused-upon entry 231. In one embodiment, the auxiliary information area 205 includes textual or other detailed information about the focused-upon entry 231, such as for example its (a) title, (b) maturity rating, (c) quality rating, (d) genre, (e) actors, (f) year of publication, (g) director, (h) language, (i) a summary description of the movie, (j) a more detailed description or set of reviews of the movie, and the like, to the extent that such information can be conveniently presented within the auxiliary information area 205.

The auxiliary information area 205 has associated with it a control zone 206, in which the UI might receive commands and requests 113 from the user 112, such as for example to (a) select information to display about the focused-upon entry 231, (b) scroll or page the information being displayed within the auxiliary information area 205, (c) receive text or other selected information with which to search the database 221, reasonable generalizations thereof, and the like. The control zone 206 might include one more icons 208, each associated with a possible command or requests 113 from the user 112, and each associated with a function (or a selected set of functions) that the UI might perform in response to such a command or request 113 from the user 112.

Content Distance

In response to information from the database 221, including individual data fields 232 associated with each entry 231 in the database 221, the processor 101 computes an arrangement of entries 231. The arrangement of entries 231 has the property that a measure of distance between entries 231 (herein sometimes called "content distance") and a measure of distance between screen regions 201 associated with those entries 231 are maximally correlated over the entire arrangement of entries 231.

In one embodiment, the processor 101 pre-computes a content distance value for each pair of entries 231, in response to information associated with those entries 231 by the database 221. However, in alternative embodiments, the processor 101 might compute the content distance value for at least some pairs of entries 231 dynamically, in response to information associated with those entries 231 by the database 221, and possibly in response to other information obtained dynamically, such as from the communication link 111 or from the user 112.

More specifically, in one embodiment, the processor 101 examines the data fields 232 associated with each such entry 231 in the database 221, and computes an individual distance value associated with each such data field 232. The processor 101 combines these individual distance values associated with each such data field 232 to determine a content distance value associated with each pair of entries 231. Individual distance values might be continuous or discrete values, such as for example (for a continuous value) a measure of similarity of titles, a measure of difference value between year of publication, or a measure of difference in number of awards won by each movie, or (for a discrete value) whether the director or producer or studio associated with the video is the same, whether the genre or maturity rating is the same for both movies, whether both movies are classified in the same series (such as for example "Star Wars" or "Jackie Chan Movies"), or how many actors are common to both movies.

In alternative embodiments, the processor 101 may examine information associated with the movies themselves. For a first example the processor 101 might compare the movie posters for both entries 231, such as for example whether that cover art is abstract or shows a scene, whether that cover are shows a selected actor, whether that cover art is primarily pictorial or text, and the collection of brightness, hue, and saturation associated with that cover art (with the effect, for example, of differentiating between the cover of a box of "Tide" and a work from Picasso's Blue Period). For a second example, the processor 101 might compare selected frames or scenes or aspects of the movies themselves, such as for example whether the movies are generally bright or dark, show scenes that are indoors or outdoors, show fast motion or talking, or show animated or cartoon characters.

In one embodiment, relative weighting assigned to each data field of metadata is responsive to user choice, where that user choice might be expressed (a) relatively directly, such as for example by selecting a relative weighting value, (b) relatively indirectly, such as for example by the system deducing the user's preferred relative weighting value in response to those videos actually selected for viewing or as the next video for focus, or (c) in response to demographic information about the user, possibly in combination or conjunction with collaborative filtering information.

Screen Distance

In response to their selected positions for disposition on the display screen 105, the processor 101 computes a screen distance value for each pair of possible screen regions 201 that might be associated with entries 231. As described below, the set of screen regions 201 might exceed the actual size of the display screen 105, so that the set of possible screen regions 201 might significantly exceed the number of screen regions 201 that fit on the display screen 105.

In one embodiment, the processor 101 pre-computes the screen distance for each pair of possible screen regions 201, in response to their relative positions as they might be presented on the display screen 105. However, in alternative embodiments, the processor 101 might compute the screen distance value for at least some pairs of screen regions 201 dynamically, in response to information associated with the disposition of those screen regions 201 in response to entries 231 from the database 221, and possibly in response to other information obtained dynamically, such as from the communication link 111 or from the user 112. However, in an embodiment in which screen regions 201 are tiled, there is no particular requirement in the context of the invention for dynamic computation of the screen distance value.

In response to the set of associations between each screen region 201 and the entry 231 to be presented in that screen region 201 (that is, as described below, in response to the association A), the processor 101 computes a correlation value indicating how good a match that association presents. This has the effect that a relatively higher correlation indicates that the entries 231 to be presented in each screen region 201 are relatively closer when those entries 231 are relatively similar, and that a relatively lower correlation indicates that the entries 231 to be presented in each screen region 201 are not as close as they could be when those entries 231 are relatively similar.

Pseudorandom Positioning

In a pseudorandom or random manner, the processor 101 assigns at least one screen region 201 for each entry 231 in the database 221. (In alternative embodiments, the user 112 may have available a command or request 113 to filter the database 221, with the effect that this statement is true for the retained entries 231 of the filtered database 221.) This zeroth-order pseudorandom or random assignment $^0A$ has associated with it a correlation between content distance and screen distance, as determined with regard to the set of all screen regions 201 and with regard to the set of all entries 231. In this notation, the symbol $^0A$ indicates the zeroth-order assignment. Thus, the zeroth-order assignment $^0A$ has associated with it a correlation indicating how well it places entries 231 that are similar to each other in screen regions 201 that are close to each other.

In one embodiment, the processor 101 iteratively modifies the $k^{th}$ assignment $^kA$ of screen regions 201 for entries 231 in response to a pseudorandom or random input, to produce a $(k+1)^{st}$ such assignment $^{(k+1)}A$, using a technique similar to simulated annealing. For example, not intended to be limiting in any way, the processor 101 might, in response to a pseudorandom or random input, exchange the association of two screen regions 201 with their two entries 231, with the effect of altering the $k^{th}$ assignment $^kA$ of screen regions 201 for entries 231, and might make such alterations a number of times, with the effect of producing the $(k+1)^{st}$ such assignment $^{(k+1)}A$. In alternative embodiments, the processor 101 may use other techniques to attempt to substantially optimize the assignment of screen regions 201 for entries 231. For example, not intended to be limiting in any way, the processor 101 may use a gradient descent technique, a neural network technique, a genetic algorithm or genetic programming technique, a random search technique, or other techniques known in the fields of artificial intelligence and machine learning. These techniques may also be used in combination or conjunction with simulated annealing.

To perform this technique, the processor 101 determines a measure of quality of the $k^{th}$ assignment $^kA$ of screen regions 201 for entries 231, responsive to the measure of correlation between content distance and screen distance, as determined with regard to the set of all screen regions 201 and with regard to the set of all entries 231 (and in response to any effects on screen distance responsive to operations described below in the section "Scrolling and Paging"). In response to this measure of quality, the processor 101 selects an amount of modification of that $k^{th}$ assignment $^k$A acceptable to make in producing a $(k+1)^{st}$ such assignment $^{(k+1)}$A. In response to the selected amount of modification, the processor 101, in a pseudorandom or random manner, modifies the $k^{th}$ assignment $^k$A to generate a prospective $(k+1)^{st}$ such assignment $^{(k+1)}$A, for example, such as described above with regard to exchanging associations of two screen regions 201 with their two entries 231. If the prospective $(k+1)^{st}$ such assignment $^{(k+1)}$A is better than the earlier $k^{th}$ assignment $^k$A, the processor 101 repeats the process with the new $(k+1)^{st}$ such assignment $^{(k+1)}$A, thus possibly generating a newer $(k+2)^{nd}$ such assignment $^{(k+2)}$A, and so on. If the prospective $(k+1)^{st}$ assignment $^{(k+1)}$A is not better than the earlier $k^{th}$ assignment $^k$A, the processor 101 decreases the amount of modification to the $k^{th}$ assignment $^k$A acceptable to make in producing a next such $(k+1)^{st}$ such assignment $^{(k+1)}$A. When the amount of modification is less than a selected threshold, the processor 101 halts the technique and considers the final assignment A acceptable.

Dynamic Repositioning

In one embodiment, in response to a command or request 113 from the user 112 changing the focus 201a, the UI dynamically re-computes a new acceptable pseudorandom positioning assignment A. This has the effect that when the user 112 issues a command or request 113 causing the focus 201a to be changed, the Mosaic dynamically rearranges the display in response to one or more possible triggering events, with the effect that videos may be moved into or out of the user's field of vision within the OSD. In one embodiment, the one or more triggering events might include (a) an explicit request by the user for dynamic rearrangement, (b) selection of a new focused-upon entry by the user, (c) incoming new data to be incorporated by the UI for presentation, and the like, as well as combinations or conjunctions thereof.

In one embodiment, the user 112 indicates that the focus 201a should be changed by an additional action, such as a button press, mouse click, or touch-pad tap. However, in the context of the invention, there is no particular requirement that one of these specific additional actions is required. Those skilled in the art would recognize, after perusal of this application, that one or more of the following alternatives might be used to signal that the display screen 105 should be dynamically repositioned, either in combination or conjunction:

For example, not intended to be limited in any way, the Mosaic might trigger dynamic repositioning in response to a timer. The timer might be triggered by one or more of the following: (a) the user 112 does not change the selection of the focus 201a, that is, the focus 201a remains the same for a time duration consistent with the user desiring dynamic repositioning to occur; (b) the user 112 does not move the pointer 203 away from the focus 201a, that is, the focus 201a is selected and the selection is "held" on the focus 201a for a time duration consistent with the user desiring dynamic repositioning to occur.

For example, not intended to be limited in any way, the Mosaic might trigger dynamic repositioning for any new focus 201a in response to challenge to the user 112 and a response therefrom. For example, not intended to be limiting in any way, the challenge might include one or more of the following: (a) a question asked by the UI of the user 112, determining a yes/no answer whether to trigger dynamic repositioning; (b) highlighting of the focus 201a and waiting for a response (or a non-response, as with the timer possibility indicated above).

Those skilled in the art would recognize, after perusal of this application, that in the former case, the Mosaic provides a more automated-like response to user action, while in the latter case, the Mosaic provides a more command-like response to user action.

In one embodiment, when performing dynamic rearrangement, the rearrangement is presented to the user 112 as a continuous process, with individual movie posters being presented as moving, for a fraction of a second, from a first screen region 201 to a second screen region 201. In alternative embodiments, the rearrangement may be presented to the user 112 as a process having at least some continuous elements, such as for example either (a) a single transform into a new assignment A, (b) a sequence of transforms, each being relatively smooth, but with time boundaries in between sequential elements, such as for example sliding individual rows and columns in a sequence, (c) a stochastic set of transforms, such as exchanging pairs of screen regions 201, or replacing a first entry 231 to be removed with a second entry 231 to be inserted. For one example, not intended to be limiting in any way, it is possible that that same entries 231 will be presented after dynamic rearrangement into a new assignment A, but in different locations.

Entry Highlighting and Emphasis

In one embodiment, the Mosaic is presented with the focus 201a highlighted or otherwise emphasized, with relatively lesser highlighting or other emphasis for those entries 231 that are not focused-upon, and with relatively lesser highlighting or other emphasis for those entries 231 positioned relatively distant from the focus 201a. For example, not intended to be limiting in any way, the entry 231 at the focus 201a might be given approximately the same brightness as other entries 231 in the same row, or immediately adjacent in the same column, but also given a distinctly-colored border. Entries 231 other than those at the focus 201a, or near the focus 201a, might be given approximately half that brightness.

In one embodiment, highlighting or other emphasis is additionally applied in response to content distance, with the effect that information presented to the user 112 is added to the information ordinarily presented by the fact of screen distance. Entries 231 near the focus 201a are given a degree of brightness (or other highlighting) in response to a measure of their content distance from the focus 201a, with the effect that if, for example, there are only two entries 231 relatively close in content distance to the focus 201a, only those two entries 231 will be highlighted to so indicate.

It has been found by the inventors that the following parameters present a UI pleasing to most users 112, and that the degree to which the UI is pleasing to users 112 is a surprising advantage, which would not have been obvious to those skilled in the art without perusal of this application. The degree of highlighting assigned to entries 231 proceeds in a relatively few step reductions (such as for example, a first level for the focus 201a itself, a second level for entries 231 having very close content distance to the focus 201a, a third level for entries 231 having somewhat close content distance to the focus 201a, and a fourth level for all other entries 231). In one embodiment, the first level includes both highlighting and a distinctly-colored border, the second level includes a degree of highlighting approximately equal to the focus 201a, the third level includes a degree of highlighting approximately half of the focus 201a, and the fourth level includes relatively no highlighting. In alternative embodiments, the degree of highlighting might be proportional to a Gaussian curve, with those entries 231 being a content distance X from the focus 201a being assigned a degree of highlighting proportional to about exp $(-\frac{1}{2}x^2)$, where exp ( ) is an exponential function.

Scrolling and Paging

In one embodiment, the UI presents the display screen 105 as a two-dimensional array of screen regions 201 (such as a movie poster for each 231 representing a video), with the property that the user 112 might scroll either horizontally or vertically within that two-dimensional array without missing any entries 231. That is, all entries 231 presented in the Mosaic appear at least somewhere in each row and each column of the two-dimensional array. This has the effect of presenting a visual illusion that the two-dimensional array is infinite in extent, while actually it is the case that scrolling in any one direction (right, left, up, down) sufficiently will eventually return to the same presentation of cover art. Those skilled in the art will recognize, after perusal of this application, that this has the effect of presenting the user with a relatively small rectangular window view onto the topological surface of a torus, but that in the context of the invention there is no requirement that the surface be a topological torus, and instead might be a topological sphere or some other shape.

In one embodiment, the UI assures that each entry 231 appears at least once in each row and at least once in each column. The UI achieves this effect by first selecting an arrangement including an assignment A, as described above in the section titled "Pseudorandom Positioning," with the additional requirement that the two-dimensional presentation of the assignment A is responsive to an offset procedure for rows other than the focus 201a as described below. Thus, the assignment A is computed so as to place all entries 231 in the library in a single row including the focus 201a, and to offset each other row as described below, but with the screen distance responsive to both the offset within the single row including the focus 201a and the offset for each other row as described below.

Thus, after selecting each $k^{th}$ assignment $^kA$, the UI determines the offset R as described below, and determines a measure of quality of the $k^{th}$ assignment $^kA$ of screen regions 201 for entries 231, responsive to the measure of correlation between content distance and screen distance, after taking into account the offset R and the number N of entries 231 in the library. Those skilled in the art would understand, after perusal of this application, that the offset R might equally well be applied to columns instead of rows, or to another type of screen arrangement of entries 231, and that such alternatives are within the scope and spirit of the invention, and would be workable without undue experimentation or further invention.

After obtaining such an assignment A, the UI notes the number N of entries 231 in the row including the focus 201a. The UI then finds the first value R such that R>2 sqrt (N) and gcd (R, N)=1, where sqrt ( ) represents the square-root function and gcd ( ) represents the greatest-common-denominator function. That is, the UI searches integers upward from 2 sqrt (N) until it finds one that is relatively prime to N. At least one such value R will be located<4 sqrt (N), and there is a high likelihood that at least one such value R will be located<2 sqrt (N) ln (2 sqrt (N)). In alternative embodiments, the UI may search integers both upward and downward from 2 sqrt (N), with the effect that the value R may be closer to 2 sqrt (N).

It has been found by the inventors that the parameter 2 sqrt (N) presents a UI pleasing to most users 112, and that the degree to which the UI is pleasing to users 112 is a surprising advantage, which would not have been obvious to those skilled in the art without perusal of this application.

After obtaining the offset R, the UI staggers each succeeding row by the offset R, with the effect that each such row and each such column includes every entry 231 in the entire library at least once. This has the effect that the assignment A, when staggered at each row by the offset R, causes each entry 231 to be available for presentation in each row (by virtue of the assignment A including all such entries 231), and causes each entry 231 to be available for presentation in each column (by virtue of the offset R).

Combining the assignment A and the offset R, the UI positions the focus 201a, and its associated entry 231, at the center of the display screen 105, and positions all other entries 231 at their associated screen regions 201 relatively offset from the focus 201a. In one embodiment, the auxiliary information area 205 and the control zone 206 are placed to the immediate left of the focus 201a. However, in the context of the invention, there is no particular requirement that the auxiliary information area 205 or the control zone 206 be placed in any particular location.

Method of Operation

Figure 3:
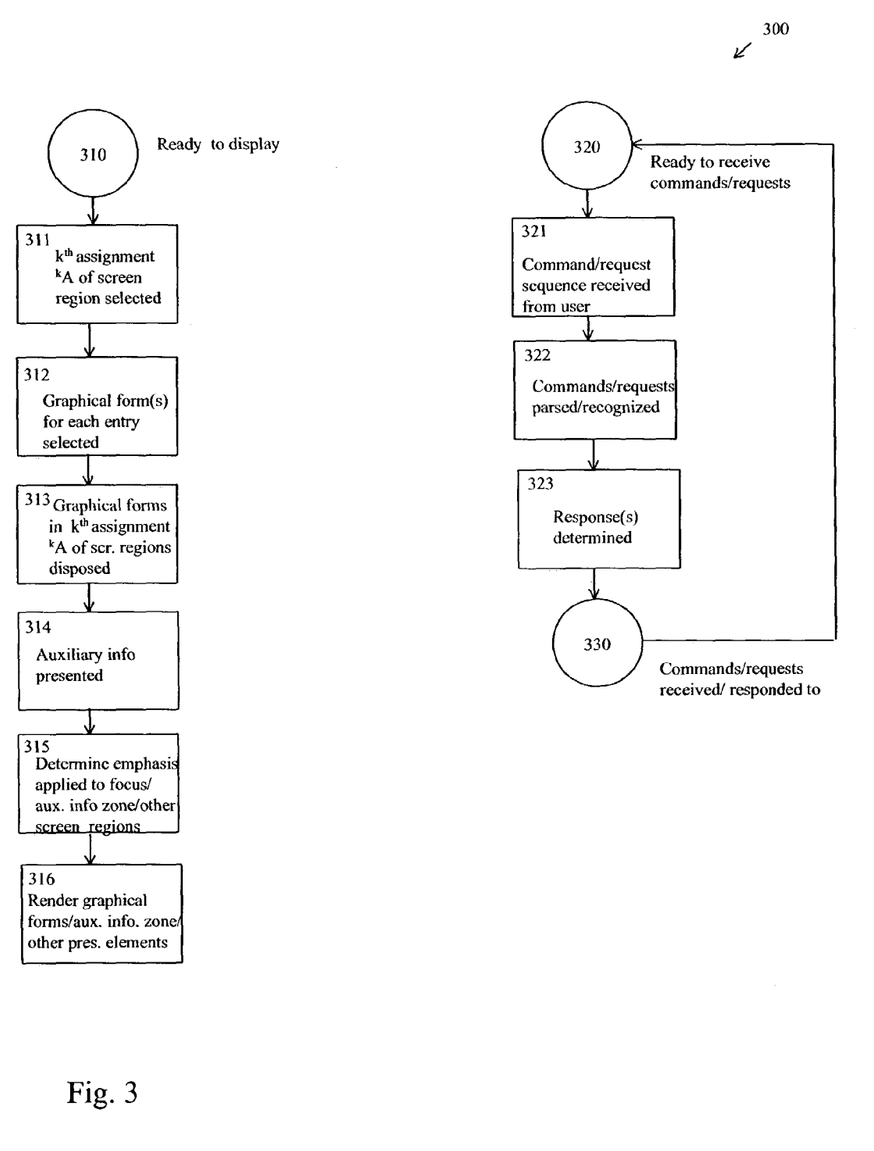
FIG. 3 shows a process flow diagram of a method including operation of a mosaic-like guided user interface for video selection and display.

FIG. 3 shows a process flow diagram of a method including operation of a mosaic-like guided user interface for video selection and display.

A method 300 is performed by the system 100. Although the method 300 is described serially, the flow points and steps of the method 300 can be performed by separate elements in conjunction or in parallel, whether asynchronously or synchronously, in a pipelined manner, or otherwise. There is no particular requirement that the method 300 must be performed in the same order in which this description lists flow points or steps, except where explicitly so indicated.

Screen Display

At a flow point 310, the system 100 is ready to display a portion of the database 221 on the display screen 105.

At a step 311, the system 100 selects a $k^{th}$ assignment $^kA$ of screen regions 201 for entries 231, responsive to the measure of correlation between content distance and screen distance, and the offset R relatively prime to N, as described above.

At a step 312, the system 100 selects at least one graphical form 201b for each entry 231. As part of this step, the system 100 determines the at least one graphical form 201b in response to a set of data fields 232 associated with that entry 231, possibly in combination or conjunction with other information. For example, not intended to be limiting in any way, the system 100 might determine the at least one graphical form 201b as follows:

The graphical form 201b might be responsive to a single data field 232, such as for example a data field including a graphic element such as a movie poster associated with that entry 231.

The graphical form 201b might be responsive to one of multiple such data fields 232, such as for example a data field including a graphic element such as a selection of one of a set of stills from a movie associated with that entry 231.

The graphical form 201b might be responsive to a combination or conjunction of multiple such data fields 232, such as for example a data field including a first graphic element for display in response to a first selected set of conditions (such as for example, if the user is a youngster and not allowed access to that movie in response to its maturity rating), and a second graphic element for display in response to a second selected set of conditions (such as for example if the first selected set of conditions do not apply).

The graphical form 201b might be responsive to a combination or conjunction of multiple such data fields 232 with demographic information about the user, such as for example a data field including a first graphic element for display to users of a first demographic type or in a first geographic region, or some combination or conjunction thereof, and a second graphic element for display to other users.

The graphical form 201b might have alternative variants by which the user might deduce further information. For example, not intended to be limiting in any way, where the iconic or representational data field involves a shape of a state or a nation, that shape might be extended by outlining or filling it with a selected hue (such as blue, red, or green) to indicate some aspect of that entry, such as for example an election report.

The graphical form 201b might be dynamically generated in response to information in the database, or other information such as for example real-time stock data, telemetry, or video. For example, not intended to be limiting in any way, where the iconic or representational data field involves an individual, that shape might be dynamically generated in response to a video feed, such as for example a webcam (a camera coupled to a communication network).

In one embodiment, the graphical form 201b includes a single iconic or representational graphic form by which a user might identify the entry or title in response to visual presentation thereof. In alternative embodiments, the graphical form 201b may include a plurality of such iconic or representational graphic forms, and the system 100 may (a) manipulate that plurality of graphic forms into a single combined graphical form 201b for display, (b) select, in response to that plurality of graphic forms, a single combined graphical form 201b for display, or (c) some combination or conjunction or reasonable generalization thereof, and the like.

At a step 313, the system 100 presents the at least one graphical form 201b associated with each entry 231, and disposes those graphical forms 201b in the $k^{th}$ assignment $^kA$ of screen regions 201, with the effect that the system 100 presents those graphical forms 201b associated with each entry 231 in a plurality of screen regions 201.

As described above, the set of screen regions 201 are disposed on the display screen 105 as a rectilinear tiled set of screen regions 201, such as for example disjoint regions as one might find in a chessboard. However, as described above, in the context of the invention, there is no particular requirement that the set of screen regions 201 take such a form. In alternative embodiments, the "Mosaic" mode of operation may include other dispositions of individual screen regions 201, such as for example (a) a hexagonal pattern of screen regions 201 disposed within the display screen 105, (b) a spiral pattern of screen regions 201 disposed within the display screen 105, (c) a perspective view having the effect of representing a multidimensional pattern of screen regions 201, such as for example a three-dimensional lattice, disposed within the display screen 105, (d) a distribution of screen regions 201 representing a set of clusters of entries 231, (e) a pseudorandom or random distribution of screen regions 201 disposed within the display screen 105, reasonable generalizations thereof, and the like.

At a step 314, the system 100 presents auxiliary information in the auxiliary information area 205 about the focused-upon entry 231 located at the focus 201a of the $k^{th}$ assignment $^kA$ of screen regions 201. As part of this step, the system 100 obtains the auxiliary information from the data fields 232 associated with focused-upon entry 231 in the database 221.

At a step 315, the system 100 determines what emphasis (such as for example highlighting) to be applied to the focus 201a, the auxiliary information area 205, and other screen regions 201, in response to the content distance and screen distance, computed as described above.

At a step 316, the system 100 renders the graphical forms 201b and the auxiliary information area 205 in their allocated screen regions 201, and renders any other presentation elements to be shown on the display screen 105, such as for example (a) scroll affordances 202a or scroll bars 202b, (b) pointing elements 203, (c) iconic or symbolic elements 204, (d) pictures, (e) text, (f) dividing lines between the screen regions 201, (g) touch-panel buttons 211 or other heads-up display elements, (h) status indicators about the system 100 drawn from outside the database 221, and the like. As part of this step, the system 100 renders any transitions from earlier presentation states, such as fade-in/fade-out, and the like.

At a flow point 320, the system 100 has displayed a portion of the database 221 on the display screen 105, and is ready to receive commands or requests 113 from the user 112.

User Requests and Responses

As described above, at the flow point 320, the system 100 has displayed a portion of the database 221 on the display screen 105, and is ready to receive commands or requests 113 from the user 112.

At a step 321, the system 100 receives a sequence of commands or requests 113 from the user 112. In one embodiment, the user 112 enters these commands or requests 113 from the at least one input element 103 in the form of button presses, such as for example from the television infrared remote control 103a or touch-panel control 103b, where the button presses might indicate (a) directions such as right, left, up, down, (b) selection or de-selection, or (c) alphanumeric entry of letters or numbers. In alternative embodiments, the user 112 may enter these commands or requests 113 from the at least one input element 103 in the form of keyboarding, mouse clicks and double-clicks, possibly in combination or conjunction with mouse movement, such as for example as might be used in entering commands or requests 113 for an ordinary PC programming environment. In further alternative embodiments, the user 112 may enter these commands or requests 113 from the at least one input element 103 in the form of voice commands or other biometric input techniques.

At a step 322, the system 100 parses or recognizes those commands or requests 113 received from the user 112. Those commands or requests 113 might direct assistant to perform actions such as described above with regard to FIG. 1 and FIG. 2.

At a step 323, the system 100 determines one or more responses 114 to make to those commands or requests 113 received from the user 112. As part of this step, the system 100 directs the at least one output element 104 (including the display screen 105) to make those responses 114, in such manner that the user 112 might readily understand those responses 114.

As part of this step, it might occur as described above that the system 100 performs one or more of the following actions, possibly in combination or conjunction:

The system 100 (a) moves the position of the pointing element 103, (b) highlights or de-highlights selected screen regions 201, (c) scrolls or pages one or more of the screen regions 201, or (d) invokes or de-invokes a selected function associated with one or more iconic or symbolic elements 204.

The system 100 (a) presents one or more selected entries 231, on the display screen 105, with the effect that the user may review those selected entries 231; or (b) changes the focused-upon entry 231, along with according changes to representation of the focused-upon entry 231.

At a flow point 330, the system 100 has received and responded to a command or request 113 from the user 112, and is ready to continue with the flow point 320 to do so again. As part of the method 300 proceeding from the flow point 320 to the flow point 330, the system 100 performs the steps described in association with the flow point 310.

Dynamic Repositioning

As described above, at a flow point 330, the system 100 has received and responded to a command or request 113 from the user 112, and is ready to continue with the flow point 320 to do so again.

In the step 311, as described above in response to a command or request 113 from the user 112 changing the focus 201a, the system 100 dynamically re-computes a new acceptable pseudorandom positioning assignment A. This has the effect that when the user 112 issues a command or request 113 causing the focus 201a to be changed, the Mosaic dynamically rearranges the display in response to one or more possible triggering events, with the effect that videos may be moved into or out of the user's field of vision within the display screen 105.

Also in the step 311, as described above with regard to dynamically re-computing a new acceptable pseudorandom positioning assignment A, the system 100 causes each row in a two-dimensional array of screen regions 201 to include all possible entries 231 and to be offset from each other such row by an offset R relatively prime to the number N of entries 231 in the library, with the effect of similarly causing each column in that two-dimensional array of screen regions 201 to include all possible entries 231 and to be offset from each other such column by a relatively prime number. This has the effect that scrolling or paging along either a row or column will eventually bring the user 112 to a graphical form 201b for each possible entry 231 in the database 221.

In the step 315, as described above, the system 100 presents the focus 201a highlighted or otherwise emphasized, with relatively lesser highlighting or other emphasis for those entries 231 that are not focused-upon, and with relatively lesser high-lighting or other emphasis for those entries 231 having relatively larger content distance from the focus 201a.

Alternative Embodiments

Although preferred embodiments are disclosed herein, many variations are possible which remain within the concept, scope, and spirit of the invention. These variations would become clear to those skilled in the art after perusal of this application.

The invention applies to any information to be presented or represented, not necessarily just to video titles. For example, not intended to be limiting in any way, the invention could be used to represent advertisements, animation, audio titles, books or other textual works, encyclopedia entries, magazines and articles therefrom, people (real or fictional), still pictures, or more generally, database entries of any kind.

The invention might be combined with other techniques for presenting or representing information. For example, not intended to be limiting in any way, the invention could be combined with a hierarchical representation of data, a hyperlinked representation of data, a dynamically generated representation of data (such as for example by an applet), or some combination or mixture thereof.

The invention applies to any information to be presented or represented, not necessarily just to video titles, in which there is at least one data field suitably iconic or representational that a user might identify the entry or title in response to visual presentation of that iconic or representational data field. For example, not intended to be limiting in any way, the iconic or representational data field might involve a picture of a person, a flag, a shape of a state or a nation, a stylized facial expression (happy, sad, and the like), an icon representing a data type or a computer program.

With regard to having at least one data field suitably iconic or representational that a user might identify the entry or title in response to visual presentation thereof, it is within the scope and spirit of the invention that the iconic or representational data field might have alternative variants by which the user might deduce further information. For example, not intended to be limiting in any way, where the iconic or representational data field involves a shape of a state or a nation, that shape might be extended by outlining or filling it with a selected hue (such as blue, red, or green) to indicate some aspect of that entry, such as for example an election report.

With regard to having at least one data field suitably iconic or representational that a user might identify the entry or title in response to visual presentation thereof, it is also within the scope and spirit of the invention that the iconic or representational data field might be dynamically generated in response to information in the database, or other information such as for example real-time stock data, telemetry, or video. For example, not intended to be limiting in any way, where the iconic or representational data field involves an individual, that shape might be dynamically generated in response to a video feed, such as for example a webcam (a camera coupled to a communication network).

The invention might be combined with techniques described in the incorporated disclosure. For a first example, not intended to be limiting in any way, the UI might present a linear ordering of each entry, with one data field in a selected row (or column), and cause that linear arrangement to be dynamically rearranged in response to the user focusing on a selected data field. This would have the effect that if the user selected a picture data field, the linear arrangement would be responsive to similarity of pictures, if the user selected a text data field, the linear arrangement would be responsive to similarity of text, and if the user selected a numeric value data field, the linear arrangement would be responsive to similarity of numeric value. The use of a similarity measure would be in contrast to the alphanumeric ordering used by the "Guide" shown in the incorporated disclosure. Alternatively, the selected data field may be more heavily weighted rather than being the only data field responded to.

The invention might be combined with techniques described in the incorporated disclosure. For a second example, not intended to be limiting in any way, the UI might present an arrangement on the display screen, with the user being given the opportunity to select weights to assign to each data field when determining the measure of content distance. In one embodiment, the user might mark selected data fields, and obtain a pseudorandom two-dimensional display responsive to those data fields. Alternatively, the user might select a relative weight to assign to each data field, with that relative weight either being variable from 0% to 100% relative weight, or being restricted to being variable to a less inclusive range, such as for example 20% to 80% relative weight. In the first alternative, this would have the effect that if the user marked a picture data field and a numeric value data field, the two-dimensional arrangement would be responsive to similarity of both the pictures and the numeric values, but not other data fields. In the second alternative, this would have the effect that if the user marked a picture data field and a numeric value data field with high relative weights, the two-dimensional arrangement would be responsive to similarity of both the pictures and the numeric values, but also to other data fields.

Those skilled in the art will recognize, after perusal of this application, that these alternative embodiments are illustrative and in no way limiting.

The invention claimed is:

1. A method for an entertainment selection system, including the steps of
representing on a display at least some of a set of media selection entries each having a set of media attribute data fields associated therewith, wherein a result of representing includes for each entry at least one graphical element in response to at least some of said data fields;
designating a specific media selection entry as a focused upon media selection entry;
calculating a content distance for each media selection entry relative to the focused upon media selection entry in response to a similarity of a plurality of media attribute data fields of each media selection entry to a plurality of media attribute data fields of the focused upon media selection entry;
determining a screen distance in response to the content distance, for each media selection entry;
positioning pictoral representations of the media selection entries on a multi-dimensional rectilinear array in response to the screen distance for each media selection entry;
presenting on a display device at least a portion of said multi-dimensional rectilinear array, wherein a user may navigate within the multi-dimensional rectilinear array so that the entire array may be viewed on the display device, and wherein media selection entries that are more similar to the focused upon media selection entry are positioned closer to said focused upon media selection entry than those that are less similar, in response to said calculated content distance for each media selection entry;
in response to a predetermined stimulus, repositioning the media selection entries within the multi-dimensional rectilinear array, wherein the focused upon media selection entry is maintained in substantially the same location on the display, and wherein the repositioning is performed in a manner that maintains substantially the same content distance of each of the media selection entries relative to the focused upon media selection entry, to form an alternate array for the same content distance calculations.

2. A method as in claim 1, including steps of
dynamically generating said graphical element in response to at least one of (a) values for said some data fields, or (b) values retrieved from a logically remote source.

3. A method as in claim 1, wherein
said graphical element includes at least one value from one of said data fields, said at least one value including at least one of (a) a picture representative to a user of its associated entry, or (b) a caption representative to a user of its associated entry.

4. A method as in claim 1, wherein
said at least one graphical element is responsive to a movie poster associated with a media stream; and
said measure of content distance is responsive to a visual characteristic of said movie poster.

5. A method as in claim 1, wherein
said at least one graphical element is responsive to a movie poster associated with a media stream; and
said measure of content distance is responsive to at least one of the following associated with said media stream: a title, a genre, at least one actor, at least one character, a series, a director, a producer, a studio, a year made or remade, a rating, or a set of awards.

6. A method as in claim 1, wherein
said at least one graphical element is responsive to a movie poster associated with a media stream; and
said measure of content distance is responsive to at least one of the following characteristics of said movie poster:
whether said movie poster is abstract or shows a scene,
whether said movie poster shows a selected actor,
whether said movie poster is primarily pictorial or text, or
a set of values for brightness, hue, or saturation associated with said movie poster.

7. A method as in claim 1, wherein
said at least one graphical element is responsive to values in a first set of said data fields;
said measure of content distance is responsive to values in a second set of said data fields; and
said first set and said second set are substantially disjoint.

8. A method as in claim 1, wherein
said measure of content distance is responsive to values in a set of said data fields;
said values are weighted in response to an indicator of user preference.

9. A method as in claim 1, wherein
said measure of content distance is responsive to values in a set of said data fields;
said values are weighted in response to at least one of the following indicators of user preference:
an explicitly selected relative weighting value,
an relative weighting value selected implicitly responsive to a set of user inputs or requests,
a set of demographic information about said user, or
a set of collaborative filtering information.

10. A method as in claim 1, wherein
a measure of display distance is responsive to relative placement of said some entries; and
said measure of content distance is positively correlated with said measure of display distance.

11. A method as in claim 1, wherein
said relative placement of said some entries is relatively nearer for pairs of entries when said measure of content distance is relatively smaller; and
said relative placement of said some entries is relatively farther for pairs of entries when said measure of content distance is relatively larger.

* * * * *